(12) United States Patent
Whitney

(10) Patent No.: US 8,397,676 B2
(45) Date of Patent: Mar. 19, 2013

(54) DROOL STOPPER DOG BOWL

(76) Inventor: Charles T. Whitney, Jupiter, FL (US)

( * ) Notice: Subject to any disclaimer, the term of this patent is extended or adjusted under 35 U.S.C. 154(b) by 122 days.

(21) Appl. No.: 12/852,876

(22) Filed: Aug. 9, 2010

(65) Prior Publication Data

US 2012/0031342 A1 Feb. 9, 2012

(51) Int. Cl.
*A01K 7/00* (2006.01)
*A01K 5/01* (2006.01)
(52) U.S. Cl. ............... 119/72; 119/64.54; 119/61.55
(58) Field of Classification Search .......... 119/72, 119/61.3, 61.5, 61.54, 61.55, 51.5, 74, 78
See application file for complete search history.

(56) References Cited

U.S. PATENT DOCUMENTS

| | | | |
|---|---|---|---|
| 968,613 A | 8/1910 | Van Ostrand | |
| 3,076,435 A * | 2/1963 | Seymour | 119/77 |
| 4,085,706 A * | 4/1978 | Evans | 119/61.54 |
| 4,286,546 A | 9/1981 | Moore | |
| 4,436,056 A * | 3/1984 | MacLeod | 119/72 |
| 4,953,506 A * | 9/1990 | Sanders | 119/61.53 |
| 5,002,017 A * | 3/1991 | Hollyday et al. | 119/73 |
| 5,297,504 A * | 3/1994 | Carrico | 119/61.54 |
| 5,738,039 A | 4/1998 | Berman et al. | |
| 5,791,287 A | 8/1998 | Gruber | |
| 5,881,670 A | 3/1999 | Pelsor | |
| 6,032,824 A * | 3/2000 | Barrow | 220/621 |
| 6,079,361 A | 6/2000 | Bowell et al. | |
| 6,928,954 B2 | 8/2005 | Krishnamurthy | |
| 7,017,518 B2 | 3/2006 | Zolnierz et al. | |
| 7,089,881 B2 | 8/2006 | Plante | |
| 7,270,082 B2 | 9/2007 | Plante | |
| 7,314,023 B1 * | 1/2008 | Denny et al. | 119/61.57 |
| 7,487,741 B2 | 2/2009 | Jordan | |
| 7,600,486 B2 * | 10/2009 | Ellis | 119/61.5 |
| 7,634,973 B1 | 12/2009 | Cribb et al. | |
| 7,856,944 B1 * | 12/2010 | Stauffer | 119/61.5 |
| 2007/0199512 A1 | 8/2007 | Ellis | |

FOREIGN PATENT DOCUMENTS

GB 2352610 2/2001

* cited by examiner

*Primary Examiner* — Yvonne Abbott

(57) ABSTRACT

The instant invention describes a drinking container for dispensing limited amounts of a liquid to an animal, generally comprising a top portion constructed and arranged to engage a bottom portion, and a bottom portion. The bottom portion has a first end and a second end defined by a bottom wall. Linking the first end of the bottom portion to the bottom wall is a side wall, thereby defining a liquid reservoir for holding a liquid. Engagement of the top portion with the bottom portion defines a drool preventing container constructed and arranged for providing an animal access to a limited amount of liquid stored within the reservoir for holding a liquid, thereby preventing or limiting drool formation as said animal drinks therefrom. The drool preventing container further contains an animal access chamber having a main body defined by a first end linked to an opening centrally positioned along the top portion, and a second end. The second end of the animal access chamber terminates in an aperture and is constructed and arranged to prevent large amounts of water from being stored within the chamber and for reducing splashing water from exiting the device while the animal is drinking.

19 Claims, 17 Drawing Sheets

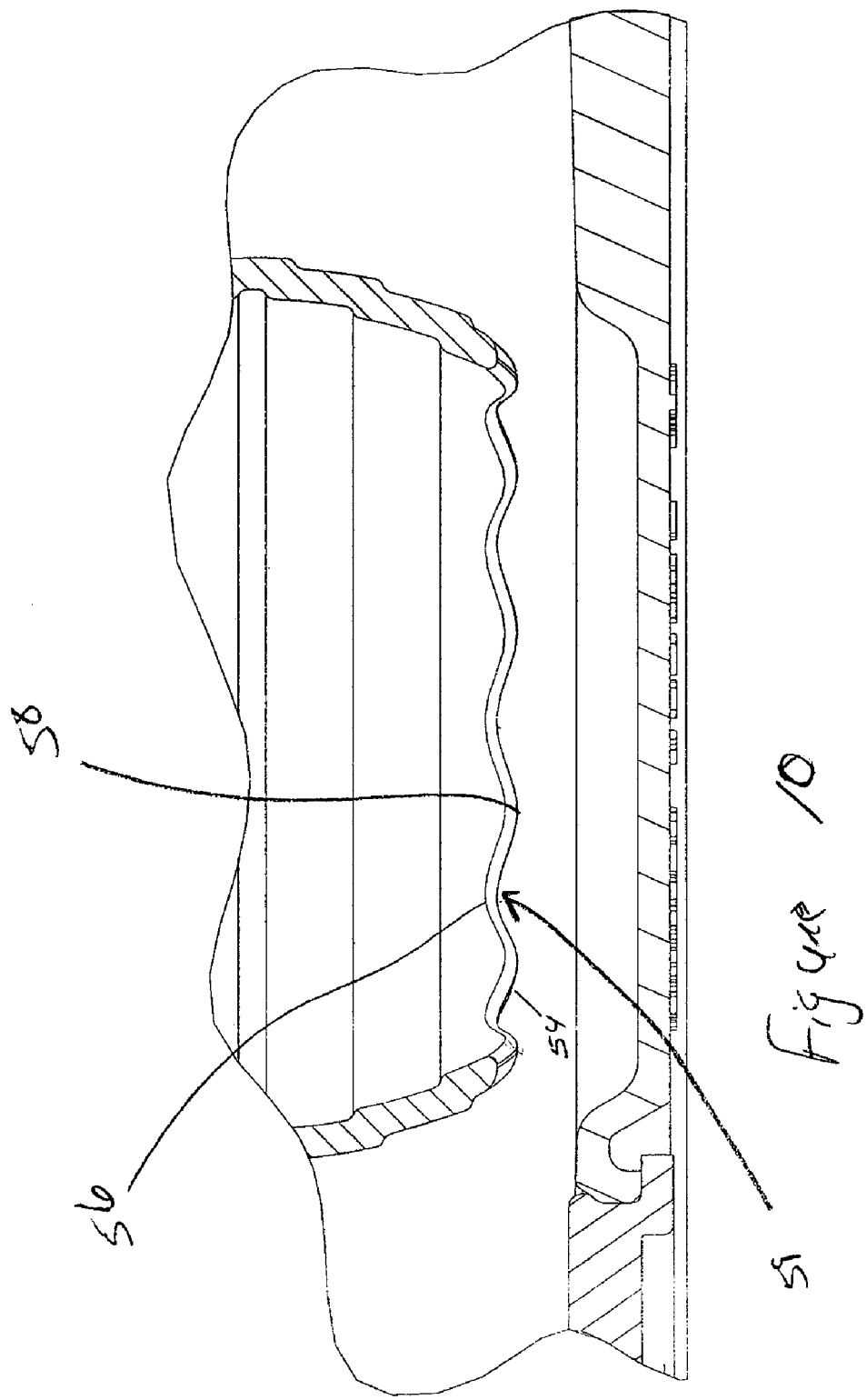

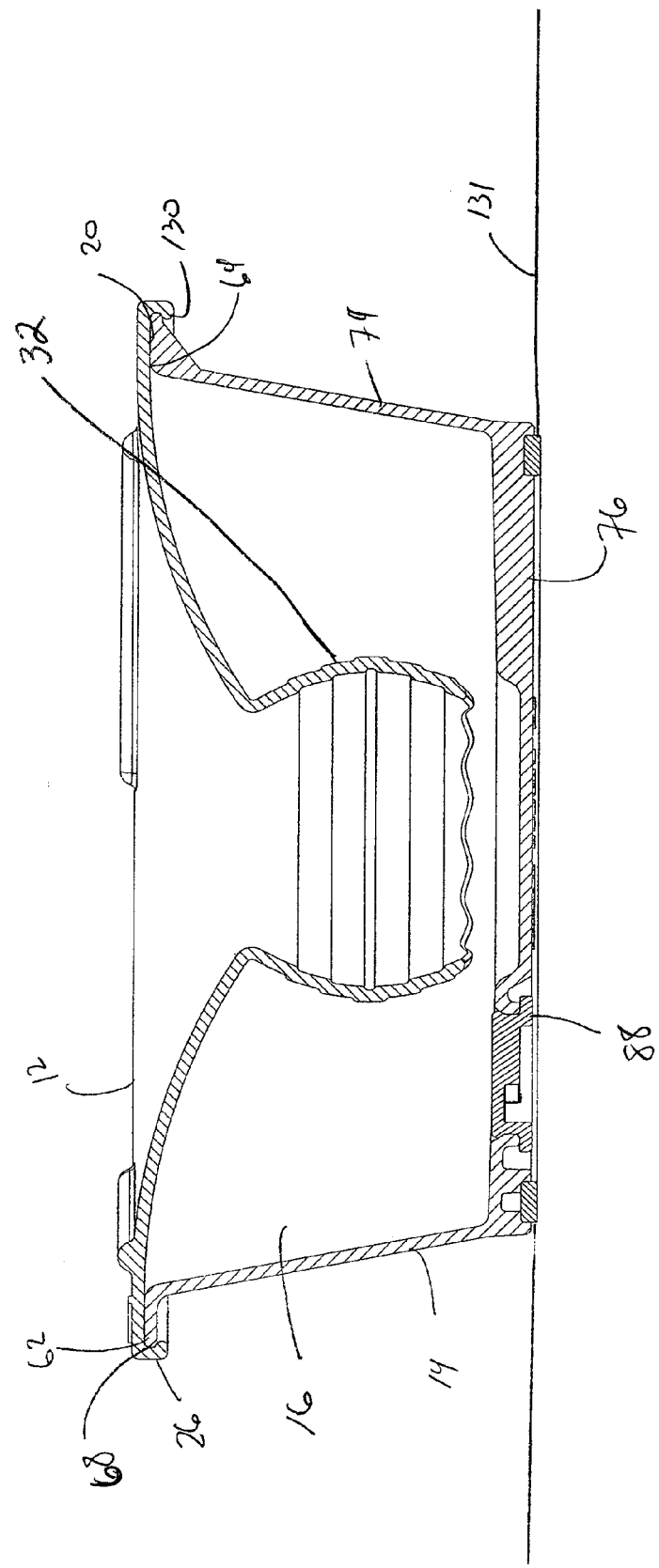

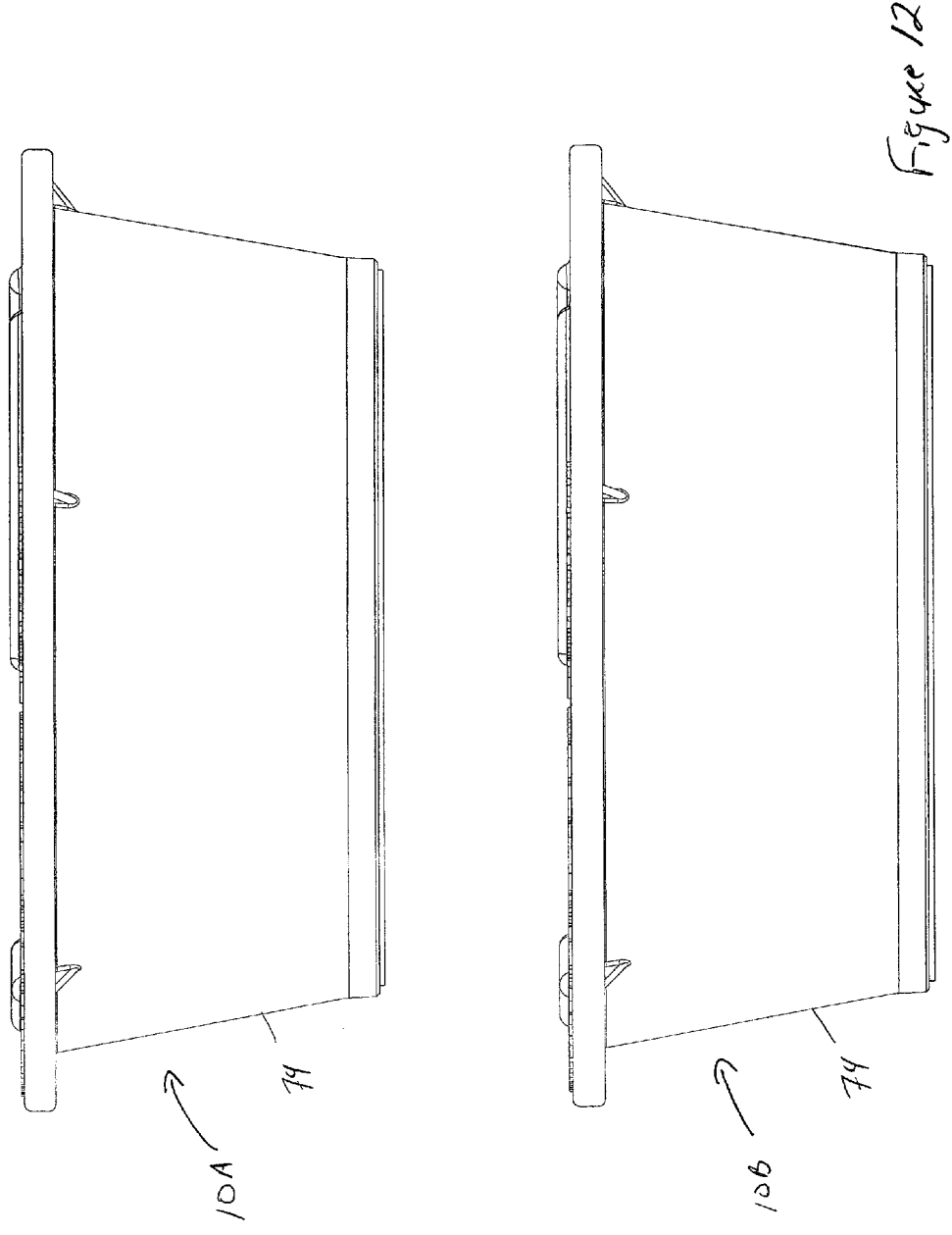

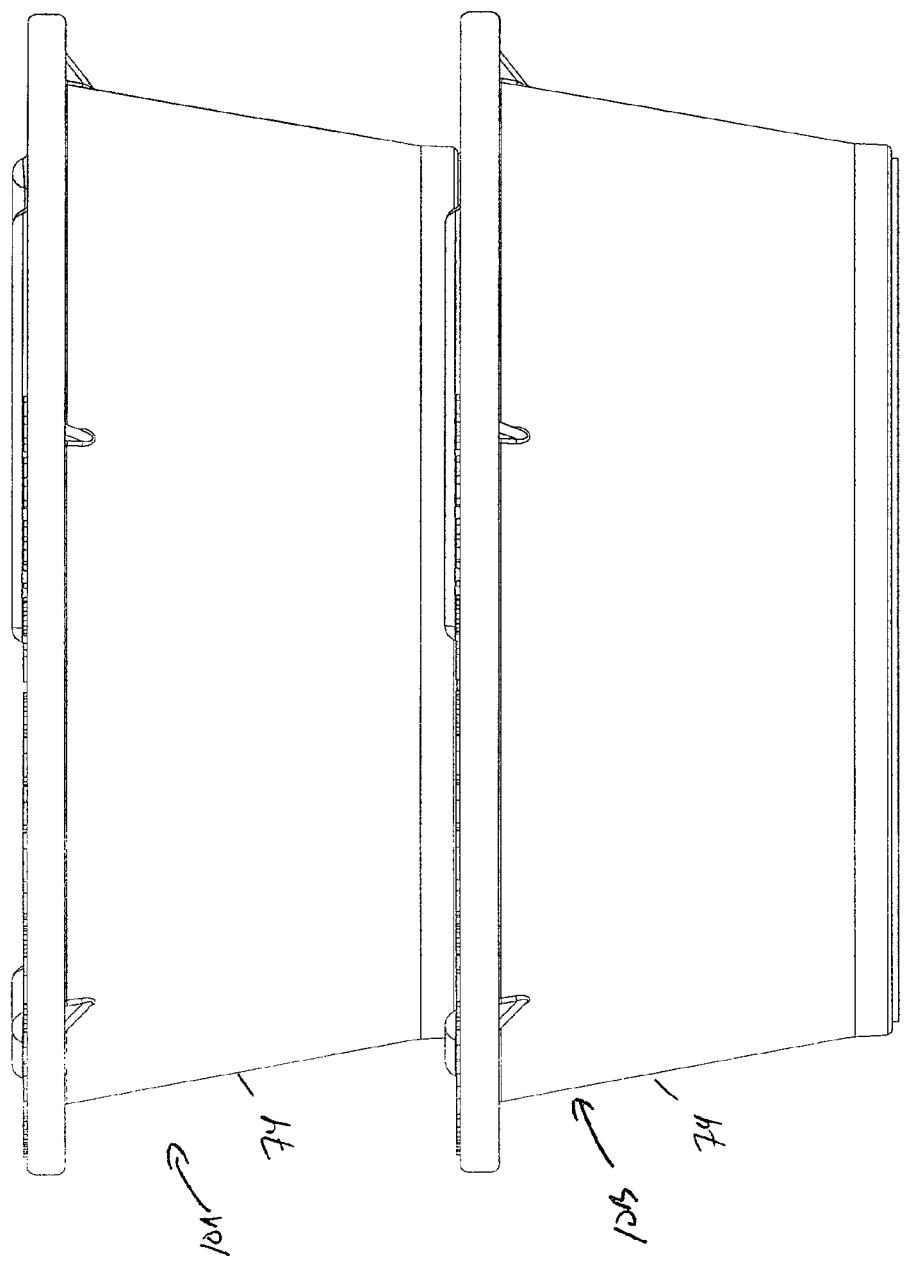

DROOL STOPPER DOG BOWL

FIELD OF THE INVENTION

The instant invention relates to pet supplies, and more particularly to a drinking and/or feeding bowl adapted for providing an animal a source of nutritional solids or liquid, and more specifically to a drinking bowl having a first section engagable with a second section to enclose a liquid material, such as water, wherein the liquid material is controllably obtained by a dog in such a manner that excess drool is minimized or prevented.

BACKGROUND OF THE INVENTION

Many households have one or more domesticated animals living within. In fact, many animal owners develop such a bond with domesticated animals, such as dogs and cats, that they are often considered as part of the family. While these animals provide benefit to humans, such as companionship and protection, a large amount of care is required in order to ensure that the animals develop properly and live healthy lives. While pack animals, such as dogs, require companionship, all animals rely on their human caretakers to provide them the basic necessity of food. In addition to food, all animals require a certain amount of fluids, such as water, for their well-being and maintenance of a healthy life-style. Since most animals are kept within a home and do not possess the ability to obtain water from a sink, they rely on their caretakers to supply a constant source of fresh water.

The most common form of providing water is through the use of container devices, such as water bowls. These devices are easy to use and maintain as the caretaker simply places the liquid within the bowl for the animal to drink at will. Any trip to a pet store or search online will reveal that there are numerous types of water bowls available for purchase and use. The watering bowls come in many shapes and sizes, and have been designed to provide several functions, including bowls that automatically dispense liquid within the bowl, bowls that aerate water, bowls that slow down the rate at which the animal drinks, and bowls that prevent large amounts of water from spilling if the dog overturns the bowl. While these dog bowls solve some common problems associated with their use, one issue not fully addressed is the problem of drooling. As most dog owners are aware, as the dog drinks from a bowl, not all the water the animal comes in contact with makes it into the mouth and is digested. Instead, depending on the size of the dog, large amounts of water spill all over the area near the bowl. Moreover, as the dog moves away from the watering spot, any drool accumulated follows the dog, leaving a trail of water all over the floor. To avoid slipping and falling, the dog owner must constantly clean up the water trail as a result of the drool.

Therefore, what is needed in the art is an animal drinking bowl that provides the animal with a non-limiting source of liquid which is constructed and arranged to prevent or limit drool or spilled or splashed liquid from contacting the surrounding area.

DESCRIPTION OF THE PRIOR ART

Devices that are capable of holding a source of liquids for animals are not new in the art. U.S. Pat. No. 968,613 discloses a water trough for stock on a farm, especially intended for watering sheep. A cover floats on the surface of the water in the trough. Secured to the cover is a plurality of cups. The cups have a plurality of holes in their lower portion which provide for the entry of water into the lower portion of the cups. More specifically related to domestic animals, such as dogs, is U.S. Pat. No. 5,791,287. The '287 patent discloses a vessel for transportation of water for animals, which resists splashing while offering easy access to the water by the animal. Most of the water within the vessel is below a substantially concave floating dish, while a smaller portion of water is within the dish. The animal accesses only the smaller portion. Water flows from below the dish to above through an opening in the dish. The floating dish prevents the splash of water by floating against an arched lid, blocking the flow of water, and by directing the flow of water under the lid, made possible by protrusions in the lid. Splash, as a result of kicking or dropping, is prevented by a plate over the hole in the floating dish.

U.S. Pat. No. 5,881,670 discloses a splash and spill-resistant container for holding fluids for animal consumption. The container forms a cavity with a top access aperture which defines an inverted channel. A partition divides the cavity into first and second chambers. The partition curves downward from the periphery substantially to the floor of the container and is provided with a flow aperture, thereby allowing fluid communication between the first and second chambers. A valve is also provided in the second chamber to release air from the second chamber and to allow the container to be emptied. After filling the container with a volume of fluid, the container may be subjected to lateral jarring or inverted without spilling the fluid contained therein. The wall does not float on the fluid.

U.S. Pat. No. 5,738,039 discloses a bowl for supplying drinking water to a pet. The inventive device includes a fluid reservoir having an open bowl projecting therefrom. A shared wall extends between the reservoir and the bowl, and includes a fluid aperture directed therethrough. A valve assembly is mounted to the reservoir and can be manually operated to open and close the fluid aperture so as to permit transferring of fluid between the reservoir and the bowl.

U.S. Pat. No. 6,079,361 discloses an animal watering system. The system includes a storage device that has a bottom, a top, a mouth located within the top, a plurality of sides, and a drinking device that is designed to dispense a liquid and to receive the bottom of the storage device. The storage device includes a selectively openable and closable port system and a sealing mechanism for sealing the mouth of the storage device. A method of using an animal watering system is also provided. The method includes the steps of placing a first cap on an orifice in the storage device, filling the storage device with a liquid through a top of the storage device, sealing the top of the storage device, placing the storage device within the drinking device, and removing the first cap from the orifice.

U.S. Pat. No. 6,928,954 discloses a pet watering system which includes a refillable reservoir for holding water. A base is provided that holds the reservoir and receives water therefrom. Secured to the front of the base is a bowl which receives water from the base. A pump circulates water between the base and the bowl. A well is associated with the base, into which water is received from the base before being circulated into the bowl.

U.S. Pat. No. 7,017,518 discloses a device and method for creating an improved feeding bowl assembly by attaching a guard device to a pet feeding bowl. The guard device is a bowl shaped guard that is positioned on top of a traditional pet feeding bowl. The guard device prevents food or water from being splashed out of the feeding bowl by the pet. Furthermore, the guard has a diameter that is larger than that of the feeding bowl. As such, the guard device catches drippings from the animal that would not otherwise be caught by the feeding bowl.

U.S. Pat. Nos. 7,089,881 and 7,270,082 disclose a pet drinking fountain. The device includes a base having a well housing a water filter and pump. A water tank is mounted on the base. A drinking dish is disposed beside the tank. The dish communicates with the well in the base, allowing water to flow from it to the well. A duct extends from the pump upward through the tank and discharges water onto the outer surface of the tank from which the water flows into the bowl. The pet can drink from the dish or lap water flowing down the tank surface. When the level of water in the well falls below a prescribed level, water from the tank is discharged into the well. A food dish may also be added to the structure.

U.S. Pat. No. 7,487,741 discloses a pet water dish designed to retain water when repeatedly overturned. One embodiment of the invention utilizes two annular chambers separated by a flat base, and having an aperture allowing water to flow from one chamber into a reservoir when the respective chamber is upright, and also allow water to flow back into the chamber when the bowl is inverted. The pet water dish may be inverted repeatedly, and each time, most or all of the water is retained in the dish. This helps ensure that the pet will always have drinking water available.

U.S. Pat. No. 7,634,973 discloses a pet bowl assembly for traveling in a vehicle. The pet bowl assembly includes a container for holding water, a bowl having a bowl base and a vertical wall projecting upwards from a perimeter of the base, a removably attached container secured to the bottom of the bowl base, and a lid removably attached to the top of the bowl. The container is shaped and sized to dimensionally correspond to the shape and size of a recess of a cup holder in a console of a vehicle. The container is securely retained within the cup holder via the dimensions and an optional adapter. The pet bowl assembly is provided for storing both food and water. The removably attached container is provided for storing pet food, while the bowl and cover are used for storing water. The embodiments optionally include a splashguard for preventing spilling when a pet is drinking from the bowl and when a vehicle is in motion. The adapter incorporates pliant features for compensating for dimensional differences between the container and the cup holder.

In addition to the U.S. patents listed above, U.S. Published Application No. 2007/0199512 discloses a drinking bowl for a pet for use in a moving vehicle. The bowl has a base section which contains a liquid reservoir having a cylindrical side wall and a removable in-turned rim at the upper end thereof. An inner section has sufficient buoyancy to float on a liquid placed within the reservoir; the inner section being a close sliding fit within the side wall and having a dished upper surface with a central liquid-receiving area. A plurality of liquid feed holes extend through the inner section to permit liquid to flow into the central area from which a pet may drink.

United Kingdom Application No. 2352610 discloses a double-walled container and a non-leaking lid having an open area for the pets to access the drinking water in the bowl. The lid has a semi-circular construction to direct water back into the bowl. A floating disk comprising two layers floats inside the bowl on the surface of the water preventing the water from creating waves or splashes when a shock force is applied to the bowl. The animal drinks the water from the aperture positioned within the disk. The bowl may also include a slip ring located in a circular track placed in the bottom of the bowl to prevent sliding.

SUMMARY OF THE INVENTION

The instant invention describes a drool preventing container for dispensing limited amounts of a liquid to an animal, generally comprising a top portion constructed and arranged to engage a bottom portion, and a bottom portion. The bottom portion has a first end and a second end defined by a bottom wall. Linking the first end of the bottom portion to the bottom wall is a side wall, thereby defining a liquid reservoir for holding a liquid. The drool preventing container further contains an animal access chamber having a main body defined by a first end linked to an opening centrally positioned along the top portion, and a second end. The second end of the animal access chamber terminates in an aperture and is constructed and arranged to prevent large amounts of water from being stored within the chamber and for reducing splashing water from exiting the device while the animal is drinking.

In a preferred embodiment, the drool preventing container for dispensing limited amounts of a liquid to an animal comprises a top portion constructed and arranged to sealably engage a bottom portion. The top portion has a generally smooth outer surface which slopes inwardly and terminates in a centrally positioned opening. The drool preventing container further includes a bottom portion defined by a first open end constructed and arranged to sealably engage the top portion and a second end defined by a bottom wall. A side wall, emanating from the first end of the bottom portion, links the first end to the bottom wall and defines the open end portion of the reservoir for holding a liquid. The bottom portion contains a liquid filling structure constructed and arranged to receive a liquid filling structure plug. When the top portion is engaged with the bottom portion and filled with a liquid, the drool preventing container is constructed and arranged to provide an animal, such as a dog, access to a limited amount of liquid stored within the reservoir for holding a liquid, thereby preventing or limiting drool formation as the animal drinks therefrom. The instant invention further includes an animal access chamber. The animal access chamber has a main body defined by a first end linked to the top portion opening, a second end positioned towards the bottom wall of the bottom portion and terminating in an aperture, and a side wall therebetween. The main body is constructed and arranged to prevent excess liquid from exiting the drool preventing drinking container as the animal drinks. To provide a sealed container, a liquid filling structure plug is inserted into the liquid filling structure.

Accordingly, it is an objective of the instant invention to provide a drinking container which is constructed and arranged to prevent an animal from drooling or splashing excessive amounts of a liquid to the surrounding area.

It is a further objective of the instant invention to provide a drinking container which is constructed and arranged to maintain a limited amount of liquid at or below an animal access chamber.

It is yet another objective of the instant invention to provide a drool preventing drinking container for dispensing limited amounts of a liquid to an animal which forms an airtight chamber when the container is filled with the liquid.

It is a still further objective of the invention to provide a drool preventing drinking container for dispensing limited amounts of a liquid to an animal which forms an internal vacuum when the container is filled with the liquid.

It is a further objective of the instant invention to teach a drool preventing drinking container which dispenses a continuous supply of a liquid to an animal for drinking while simultaneously reducing the amount of excessive liquid which is splashed or drooled to the surrounding area.

It is yet another objective of the instant invention to teach a drool preventing drinking container which is constructed and arranged to be stackable.

It is a still further objective of the invention to teach a drool preventing drinking container which is constructed and arranged to be convertible to a food container.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 10 is a partial cross-sectional view illustrating the second end of the animal access chamber;

FIG. 11A is a cross-sectional view of the instant invention prior to filling with water;

FIG. 12 is a side view of the instant invention illustrated in FIGS. 1-7 in a non-stacking position;

FIG. 13 is a side view of the instant invention illustrated in FIGS. 1-7 in a stacking position;

DETAILED DESCRIPTION OF THE INVENTION

Figure 1:
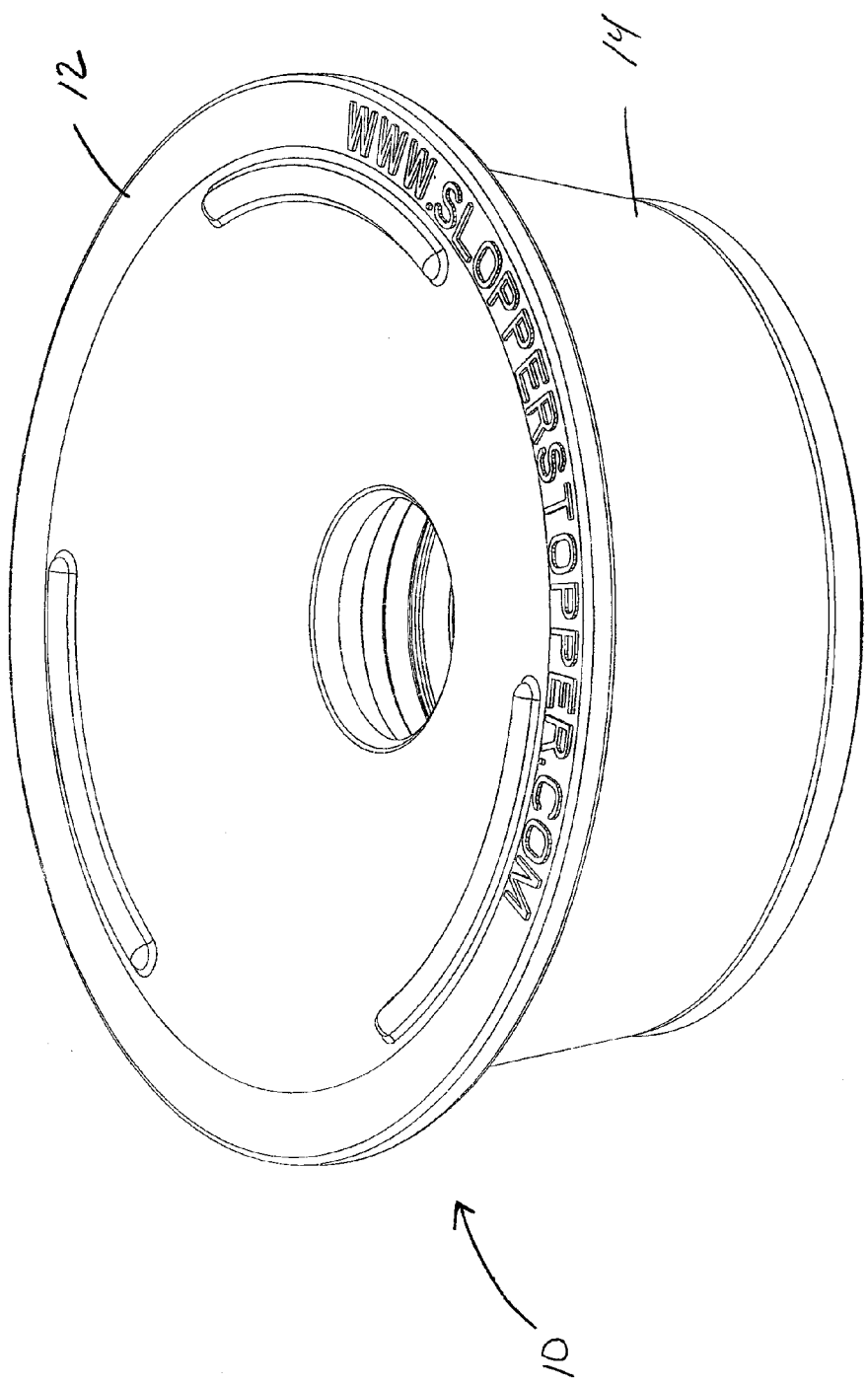
FIG. 1 is a perspective view of one embodiment of the drool preventing container of the instant invention.
Figure 2:
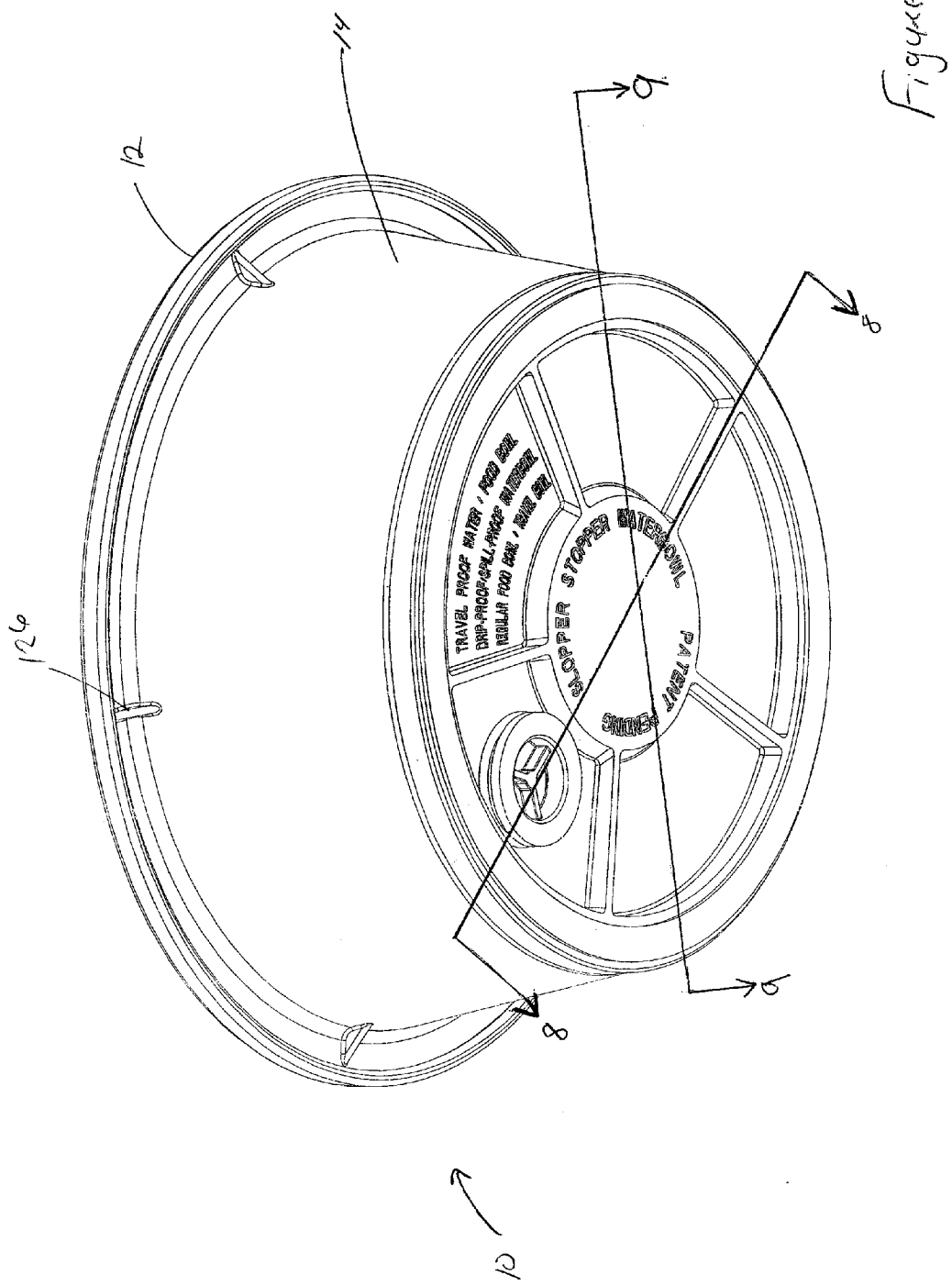
FIG. 2 is a bottom perspective view of the embodiment illustrated in FIG. 1.
Figure 3:
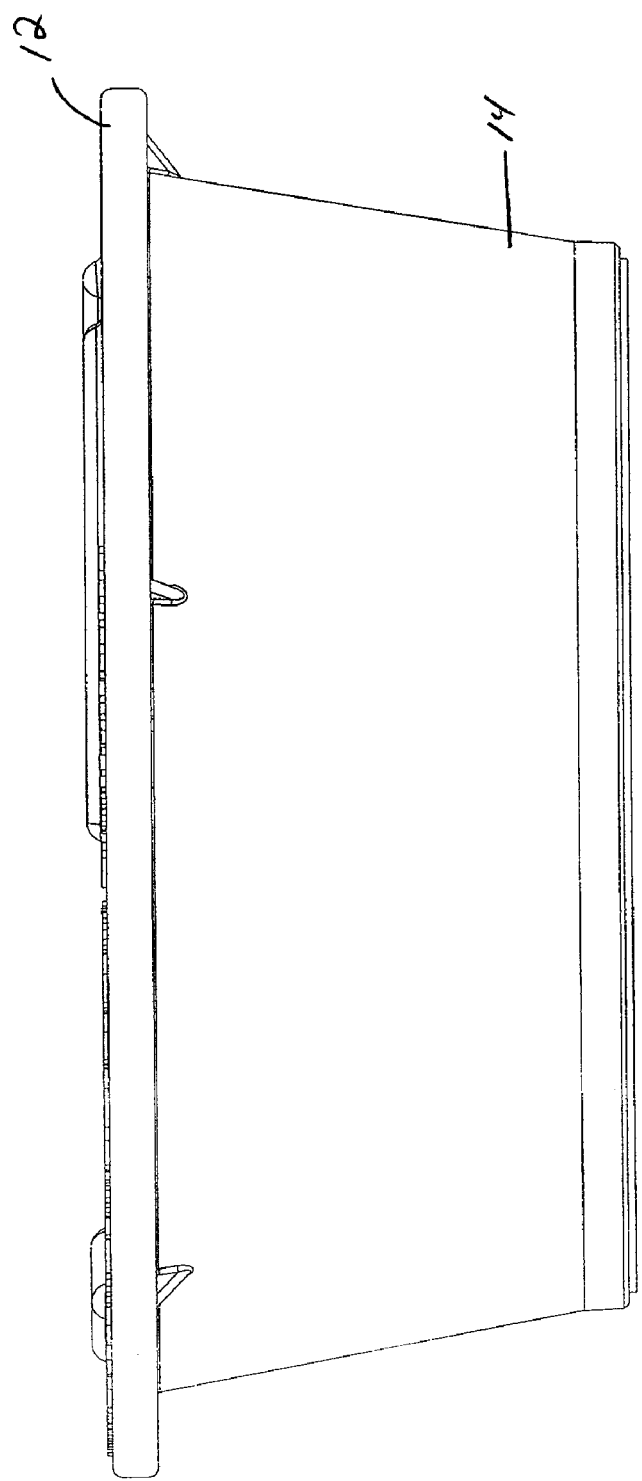
FIG. 3 is a left side view of the embodiment illustrated in FIG. 1.
Figure 4:
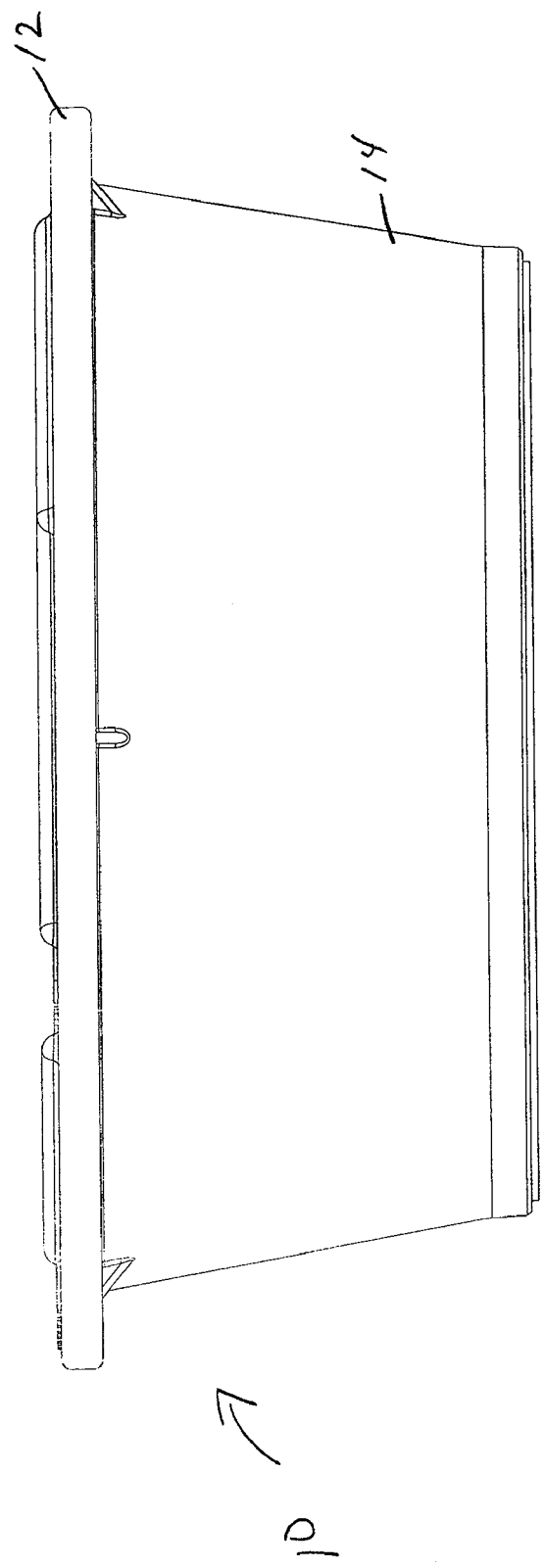
FIG. 4 is a right side view of the embodiment illustrated in FIG. 1.
Figure 5:
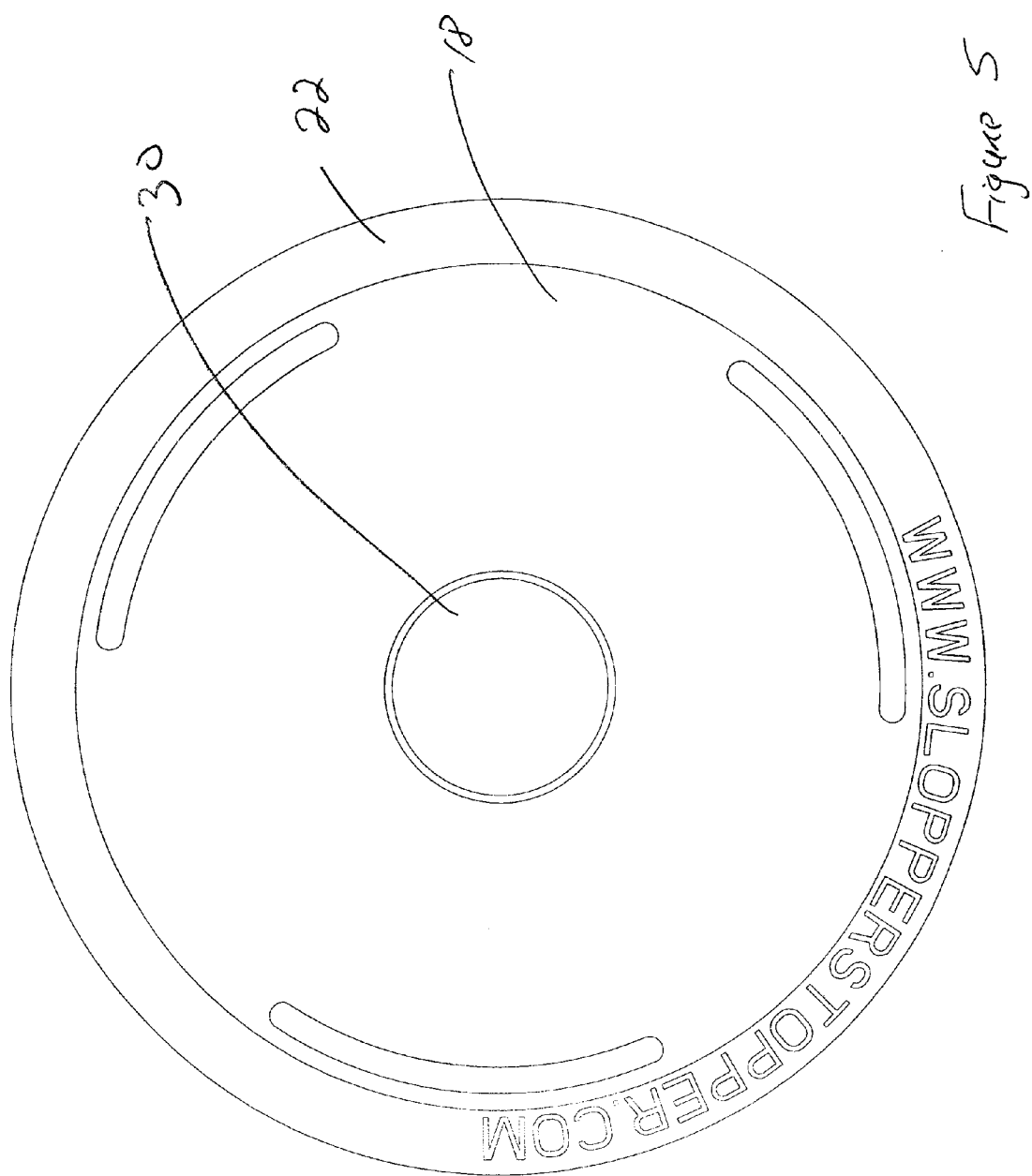
FIG. 5 is a top view of the embodiment illustrated in FIG. 1.
Figure 6:
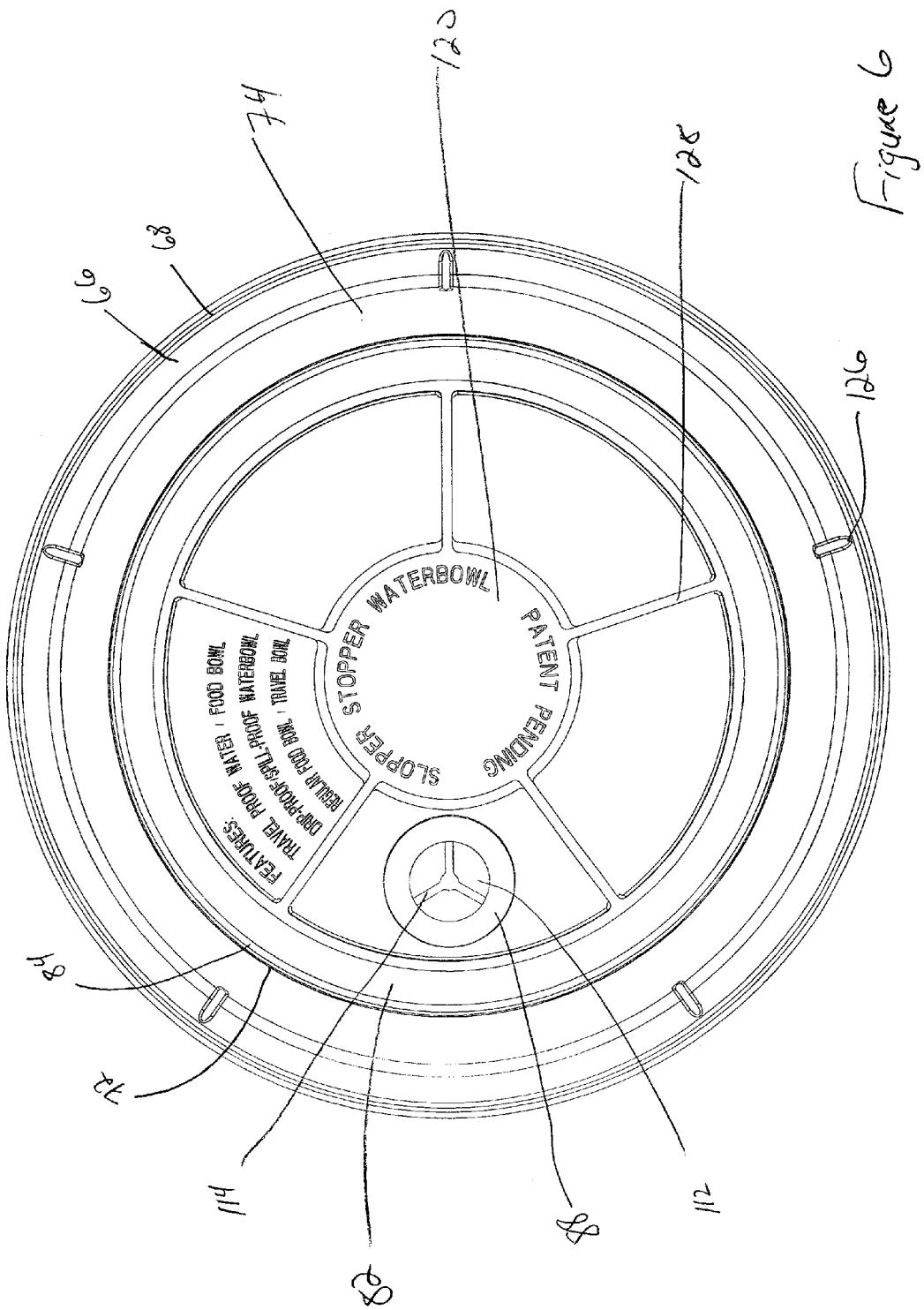
FIG. 6 is a bottom view of the embodiment illustrated in FIG. 1.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

With reference to FIGS. 1-7, the drool preventing drinking container for dispensing limited amounts of a liquid to an animal is shown and indicated by the number 10. The drool preventing drinking container comprises an upper portion 12 constructed and arranged to engage a lower portion 14 to define an enclosed liquid holding reservoir 16, which when filled with a liquid forms an airtight enclosure. While the instant invention is designed to hold any liquid, the use of water as an illustrative example of a type of liquid will be used throughout the specification, and is not intended to be a limiting example. Moreover, while the figures illustrate the drool preventing drinking container 10 in the preferred rounded or oval shape, such shapes are illustrative only, and therefore, the drool preventing drinking container 10 can be designed in any shape. The drool preventing drinking container may be made of opaque, translucent or transparent materials including plastics such as polyethylene, polypropylene polycarbonate or other thermoplastic polymers, or molded plastics, ceramics, rubber, metals, such as stainless steel, or combinations thereof, as well as any other materials commonly used to make dog bowls. If plastic materials are used, one or all parts of the drool preventing drinking container can be integrally formed through blow-molding techniques or through injection molding techniques.

Figure 7A:
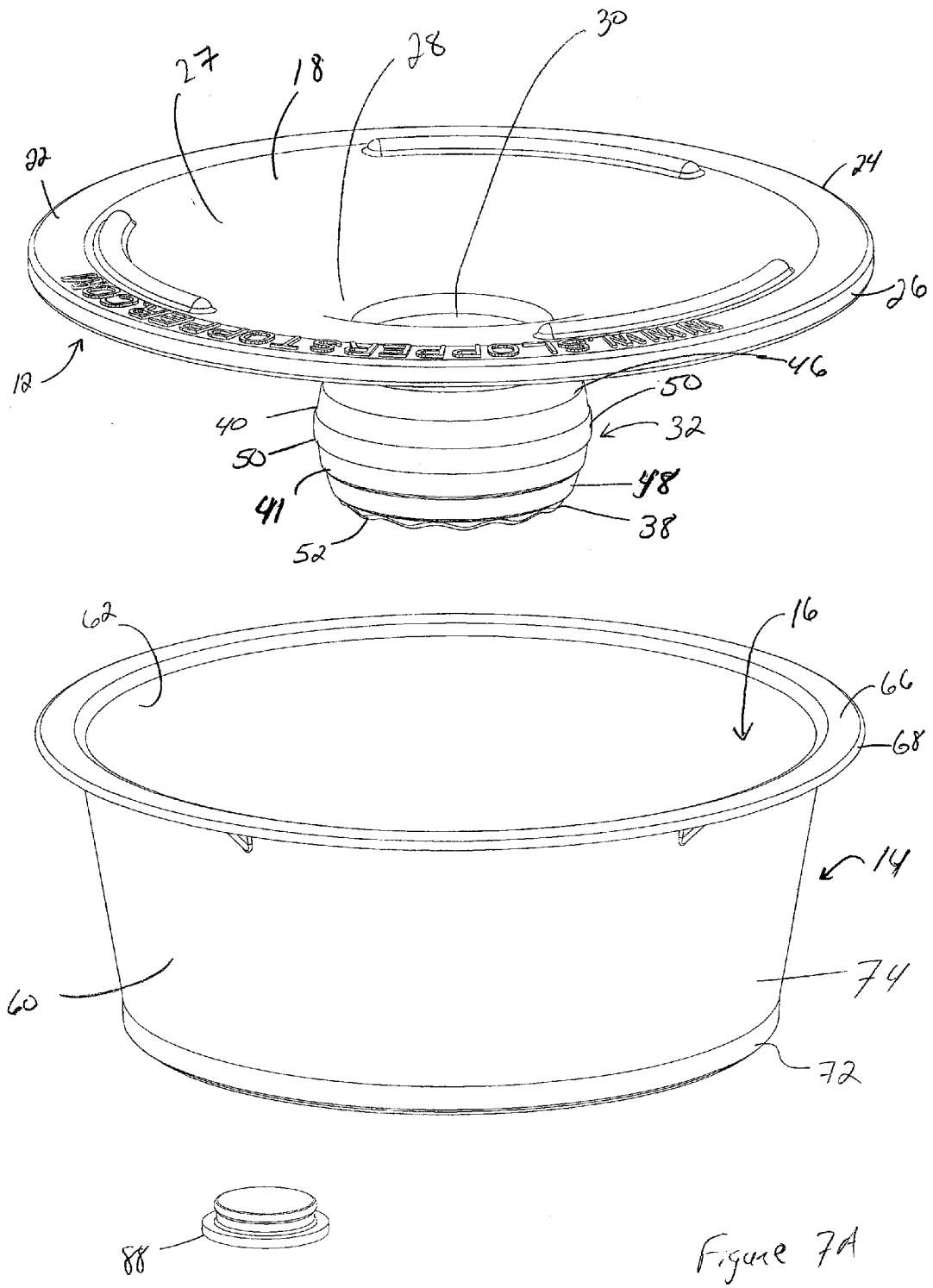
FIG. 7A is an exploded view of the instant invention illustrated in FIGS. 1-6.
Figure 7B:
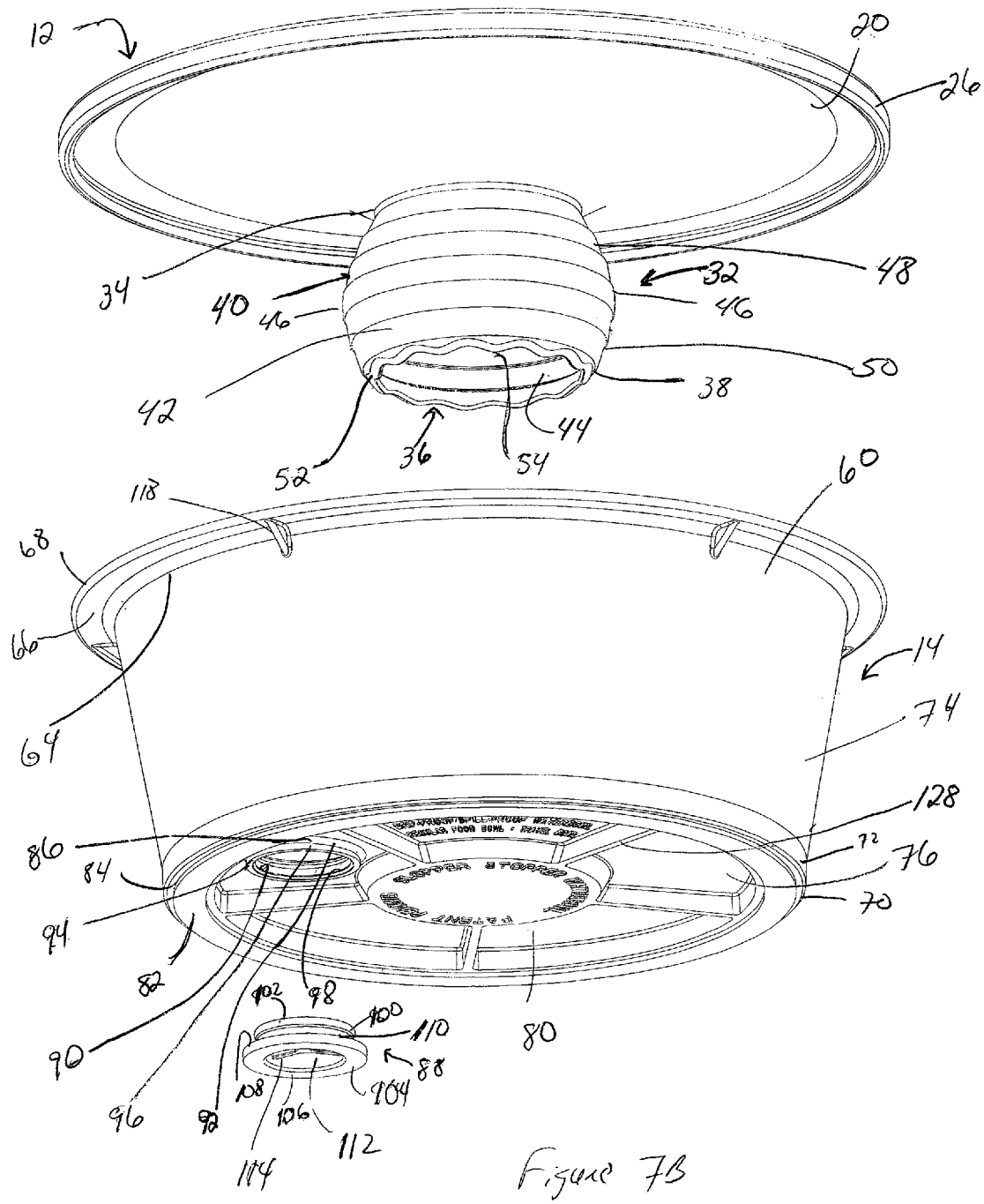
FIG. 7B is an alternative view of the exploded view of FIG. 7A.

Referring to FIGS. 7A and 7B, the upper portion 12 comprises a top surface 18 and a bottom surface 20. The top surface 18 contains an upper portion rim 22 which forms the perimeter 24 of the upper portion 12. Extending in a downward position from the upper portion rim 22 is a diverging edge 26. The top surface 18 can be constructed as a generally flat or smooth surface. However, in a preferred embodiment, upper portion 12 can be constructed to contain a generally flat region 27 and an inwardly sloping region 28. The sloping region 28 terminates at an opening 30. While opening 30 can be positioned anywhere along the upper portion 12, it is preferable to be centrally located. The degree of slope and the diameter of the upper portion opening 30 can be varied, dependent upon the shape and size of the dog's snout and head. The degree of slope and the diameter size, therefore, may differ for dolichocephalic breeds, i.e. long and thin heads and snouts, such as certain types of Collies, than that used for extremely brachycephalic breeds, i.e. minimal or nearly non-existent snouts, such as pugs.

Diverging from the bottom surface 20 of the upper portion 12 is an animal access chamber 32. The animal access chamber 32 may be integrally formed with the upper portion 12 in such a manner that the upper portion opening 30 defines a first end 34 of the animal access chamber 32 and a second opening 36 defines the second end 38 of the animal access chamber 32. The inclusion of the animal access chamber 32 provides an advantage over other devices that require the insertion of a floating device in order to prevent the animal from obtaining too much water. Devices that require a floating member placed over a large pool of a liquid are prone to the animals playing with the floating device, pushing down on it, or removing it, thereby increasing the risk of spilling or turning over of the device. Extending between the first end 34 and the second end 38 is the animal access chamber 32 main body 40 constructed and arrange for reducing the amount of splashing water that exits the container as the animal drinks. As an illustrative and non-limiting example, the animal access chamber 32 has a generally tubular, cylindrical shape. Such shape, however, is not intended to be limiting. The animal access chamber 32 main body 40 has a wall 41 comprising an outer surface 42 and an inner surface 44. The animal access chamber 32 has a generally convex shape defined by a first tapered end 46 directed inwardly toward the first end 34 of the animal access chamber 32 and a second tapered end 48 directed outwardly toward the second end 38 of the animal access chamber 32. Positioned between the first tapered end 46 and the second tapered end 48 is a protuberance 50. In this shape, the animal access chamber 32 contains a middle section, which has a wider diameter than the diameters associated with the top and bottom portions, i.e. above and below the protuberance 50. The animal access chamber 32, therefore, is designed to prevent the splashing of water from exiting the container as the animal drinks. The size of the animal access chamber 32 main body 40 can be varied, with the corresponding size determined by the size of the animal's face, snout and/or the length of the tongue associated with the animal which uses the device. The distance between the first end 34 and the second end 38, for example, can be constructed to correspond to the length needed for the dog's tongue to be inserted within and contact the water supplied and stored within.

The animal access chamber 32 main body 40 illustrated in FIGS. 1-7 is designed for dogs weighing between 40 and 100 pounds. While the distance between the first end 34 and the second end 38 of a most preferred, although non-limiting, embodiment for dogs in this weight range is designed to be approximately 1.822 inches, such distance can designed to a length which is not too small so as to increase splashing and water exiting out the chamber or increase the likelihood that the animal can access too much water. Additionally, the length can not be too large so as to result in preventing the dog from reaching the water level. The diameter of the first end 34 and the second end 38 can be varied as well. A preferred embodiment includes the diameter length of the first end 34 to be approximately 1.96 inches. This length, however, is non-limiting as the diameter could be any length that is not too large so as to allow the animal to place its animal's face, snout, and ears into the water and not too small so as to prevent the animal's tongue from comfortably reaching the water. Additionally, the diameter length for the second end could be designed to have a length of approximately 2.149 inches. The diameter at the widest portion can be, for example, 2.50 inches. For dogs that are smaller or larger than the 40-100 pound range, the dimensions can be proportionally increased or decreased. Therefore, for small dogs, like Yorkshire terriers, Beagles, or French bulldogs, which have relatively small snouts and tongues, the drool stopper drinking bowl 10 will contain an animal access chamber 32 which has a smaller length/and or diameter as compared to a drool stopper drinking bowl 10 with an intended use for larger breeds, such as German Shepherds or Golden Retrievers.

The second end 38 of the animal access chamber 32 main body 40 contains edge 52, illustrated herein has a wave-like contour, or scalloping. The scalloped contour contains a series of curved projections 54 having a series of upper curvatures 56, lower curvatures 58, and generally curved areas 59 in between, see FIG. 10. While the length and spacing between the curved projections and/or the upper curvature 56 and a lower curvature 58 can be varied, the scalloped edge may be constructed such that one or more portions of the curved projections 54 rest above the liquid level line when the liquid level line rests at or near the lowest point of the second end. While such a contour has been found to be a preferred shape to allow for the flow of water from the liquid holding reservoir 16 to the edge 52 and maintaining at that level without filling into the inner surface 44 of the access chamber, the contour of edge 52, as illustrated, is not intended to be a limiting example.

Figure 9:
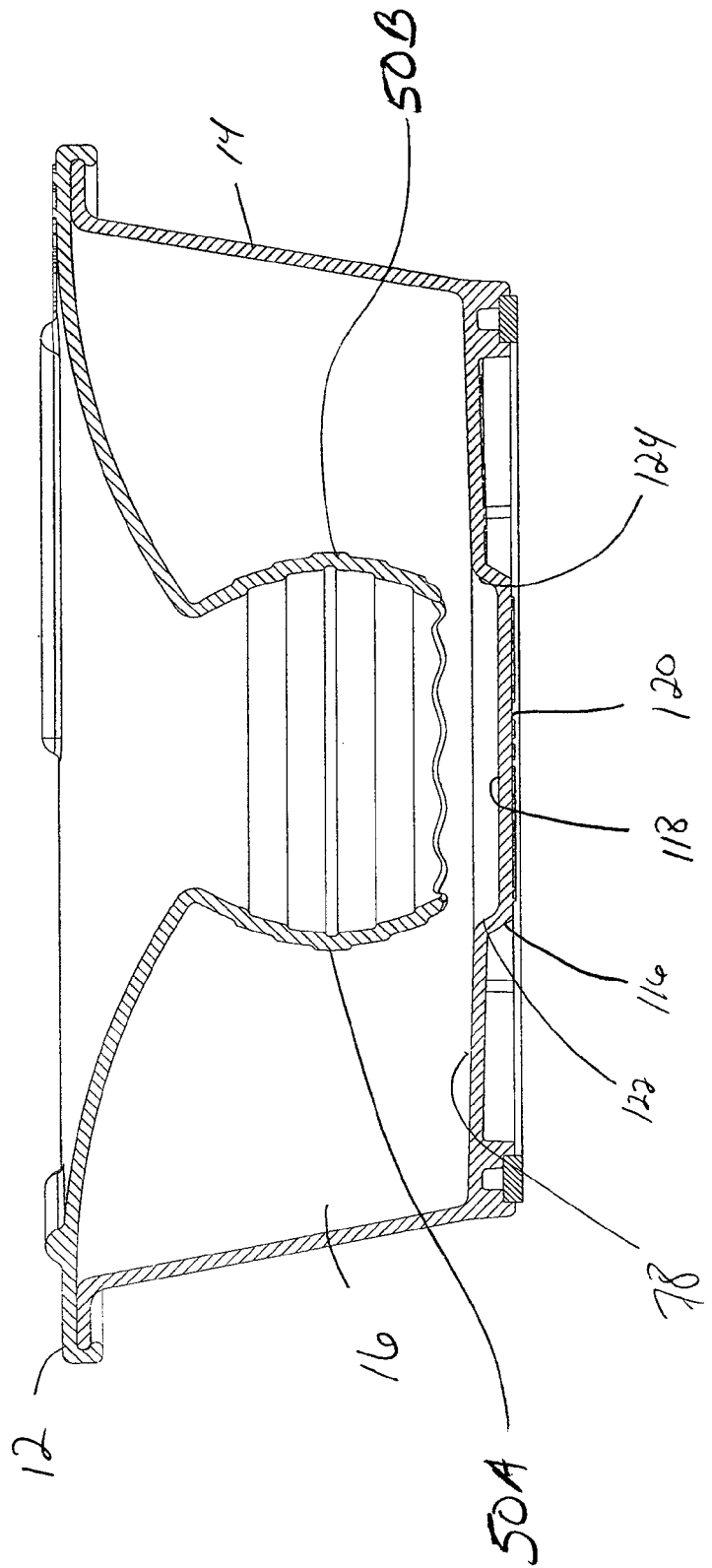
FIG. 9 is a cross-sectional view taken along lines 9-9 of FIG. 2.

The lower portion 14 comprises an outer surface 60 and an inner surface 62. The top end 64 of the lower portion 14 contains a lip 66 with an edge 68. The bottom end 70 contains a rim 72. Connecting the top end 64 and the bottom end 70 is a side wall 74. A bottom wall 76, which forms the floor of the device, has a top surface 78, see FIG. 9, and a bottom surface 80, and is connected to, or is integrally formed with the side wall 74 at the bottom end 70 while the top end 64 is open, thereby providing for a partially enclosed lower portion that forms the liquid holding reservoir 16 for enclosing various liquids, such as water, or nutritional solids, such as food. While the side wall 74 may form a right angle connection with the bottom wall 76, it is preferable that the side wall 74 be angled, thus providing a tapering as the side wall 74 moves from top end 64 of the lower portion 14 towards the bottom end 70. The bottom wall 76 may contain a second rim 82 separated from rim 72 by spacing 84. Rim 82 may provide structural support and balance for the device when placed on a surface. Additionally, rim 82 may act as an anti-slipping member, and can be constructed from an anti-slipping material, such as various rubbers, known to one of skill in the art. In addition to, or in place of rim 82, other anti-slipping members known to one of skill in the art, including feet, may be used as well.

To provide for placing a liquid within the lower portion 14, a liquid filling structure 86, constructed and arranged to engage a liquid fill structure plug 88, is positioned within the bottom wall 76. While the liquid filling structure 86 may simply be an opening of various sizes and shapes, the liquid filling structure 86 as illustrated herein, contains an aperture 90 surrounded by an edge 92. Extending downward from the edge 92 is a wall 94, having an outer surface 96 and an inner surface 98. Inserted within the liquid filling structure 86 is a liquid fill structure plug 88, illustrated herein having a first circular member 100 having a top surface 102 and a second circular member 104 having a first surface 106 and a second surface 108. Connecting the first circular member 100 and the second circular member 104 is a longitudinal member 110 which defines the length of the liquid fill structure plug 88. The first surface 106 of the second circular member 104 may contain a recessed area 112 which contains grasping members 114 to aid the user in inserting or removing the liquid fill structure plug 88 to or from the liquid filling structure 86. Upon insertion within, the liquid fill structure plug 88 is designed to lay flush with the top surface 78 and the bottom surface 80 of the bottom wall 76.

Figure 8:
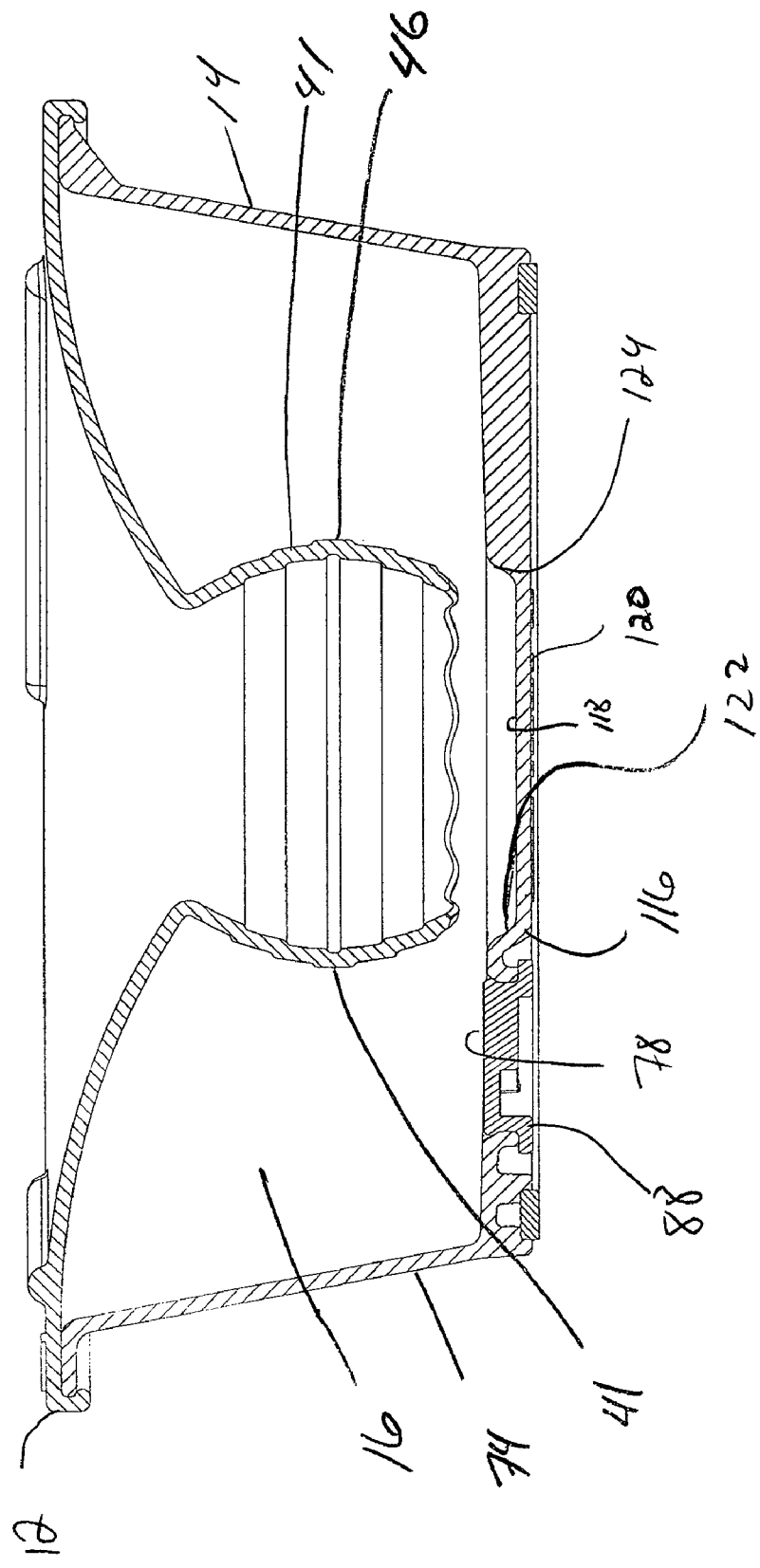
FIG. 8 is a cross-sectional view taken along lines 8-8 of FIG. 2.

The top surface 78 of the bottom wall 76 forms the inner floor of the drool preventing drinking container 10. The inner floor is preferably constructed to have a downward slope towards the middle, but need not have such shape. At or near the center of the floor is a low spot, or depressed area 116, illustrated herein as circular in shape, having a top surface 118 and a bottom surface 120 and having a length defined by sloping walls 122 and 124, see FIGS. 8 and 9. The depressed area 116 is designed to serve several functions. First, when the drool preventing drinking container 10 is filled with water, the depressed area 116 is designed to allow a portion of edge 52 of the animal access chamber 32 to maintain a position that is almost flush with the outer bottom surface of the lower portion 12. As the unit is filled, the depressed area provides the liquid holding reservoir 16 with the ability to be filled to near capacity while leaving a minimal amount of air within the reservoir 16. In addition, the depressed area also prevents water from completely filling into the inner portion of animal access chamber 32.

The position of the depressed area 116 is preferably positioned parallel to and substantially aligned with the positioning of the animal access chamber 32 such that the length of the depressed area 116 from the sloping walls 122 and 124 has a length that is equal to or substantially similar to the length of the diameter of the second opening 36 of the animal access chamber 32 or corresponding to the distance between the protuberance 50A and 50B. While the distance between the edge 52 of the animal access chamber 32 and the bottom surface 120 of the depressed area 116 can be varied, a most preferred, although non-limiting embodiment of the instant invention includes a distance between the upper curvatures 56 and the bottom surface 120 of the depressed area 116 of seven-sixteenth (7/16th) inch and a distance between the lower curvatures 58 and the bottom surface 120 of the depressed area 116 of three-eights (3/8th) inch.

The drool preventing drinking container 10 includes one or more integrally formed gussets 126 (see for example FIG. 2) for added strength and rigidity. The gussets 126 increase the structural integrity of the lower portion 14 by preventing the lip 66 or lip edge 68 from bowing or bending inwardly or outwardly and thus, adversely affecting the appearance or operation of the drool preventing drinking container 10. The integrally formed gussets 126 are preferably positioned between the lip 66 or lip edge 68 and the side wall 74. In addition to gussets 126, the drool preventing drinking container 10 contains ribs 128, located on the bottom wall 76. The ribs 128 connect either from the side wall 74 or the rim 82 to a portion of the bottom surface 120 of depressed area 116. The strengthening ribs 128 can be integrally formed within the drool preventing drinking container 10 in order to enhance rigidity of the components while leaving the external surface in a generally aesthetically pleasing appearance.

Figure 11B:
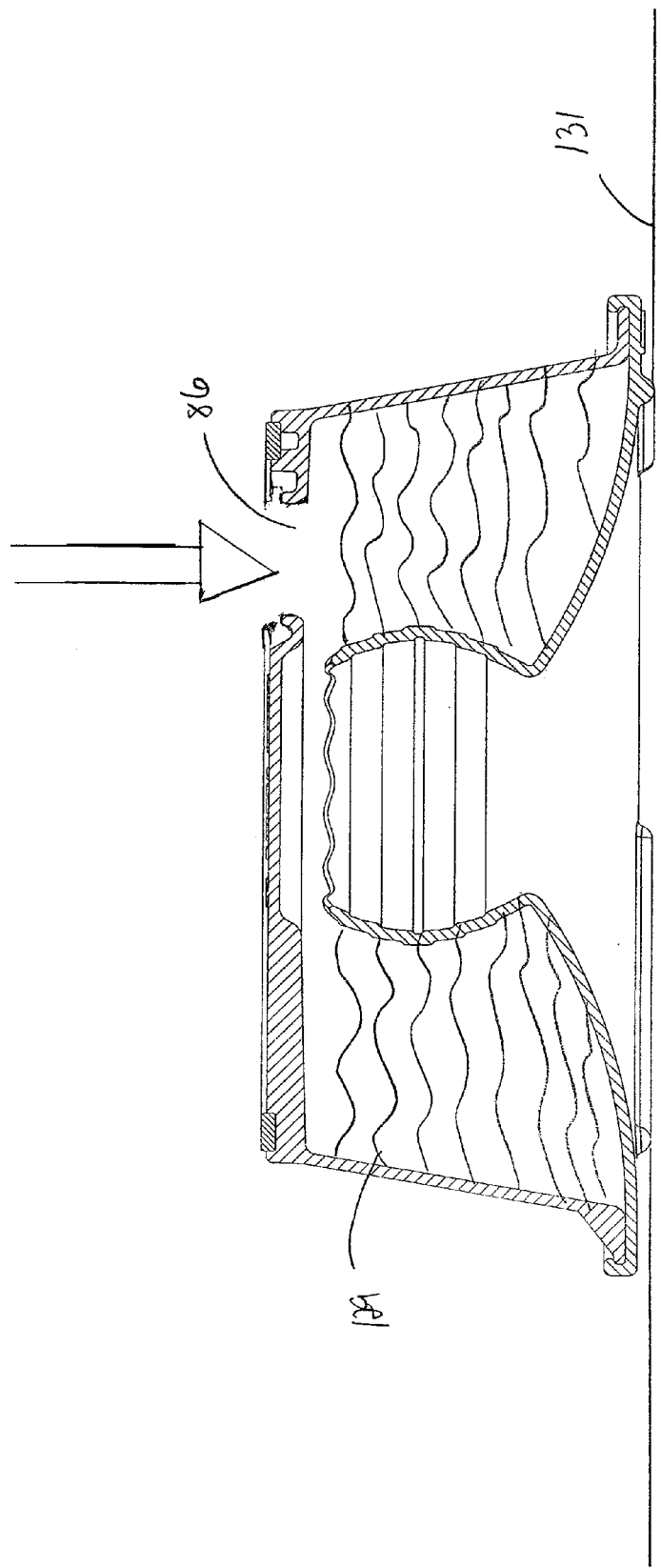
FIG. 11B is a cross-sectional view of the instant invention in an inverted position, illustrating the container filled with water.
Figure 11C:
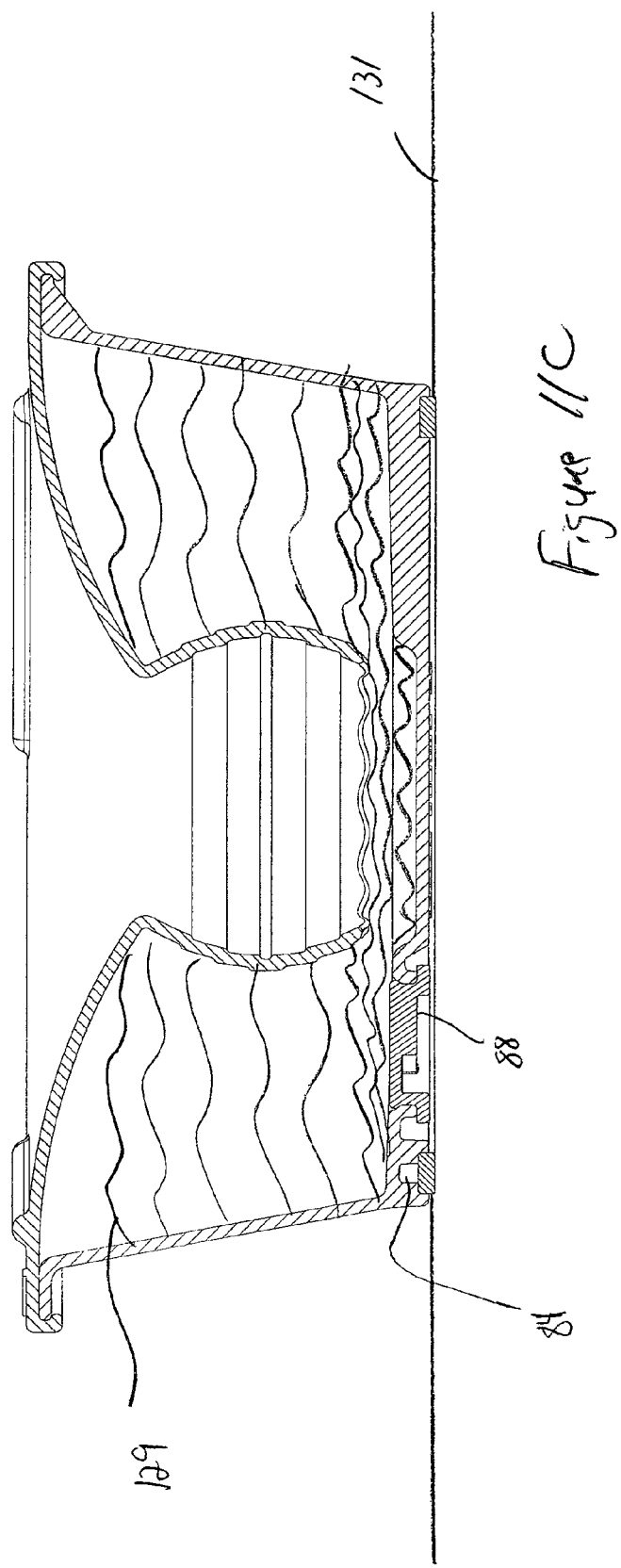
FIG. 11C is a cross-sectional view of the instant invention in the upright position, illustrating the container filled with water.

FIGS. 11A-11C illustrate the filling of the drool preventing drinking container 10 with water. To use the drool preventing drinking container 10, a user assembles the container by securely fastening the upper portion 12 to the lower portion 14. To accomplish such a task, the user simply lowers the upper portion 12 such that the bottom surface 20 of the upper portion 12 contacts the top end 64 of the lower portion 14. In this alignment, the animal access chamber 32 is placed within the liquid holding reservoir 16 which is defined by the side wall 74 and the bottom wall 76 of the lower portion 14. To tightly secure the upper portion 12 to the lower portion 14, the bottom surface 20 of the upper portion 12 engages a portion of the lip 62 such that the lip edge 68 rests within the diverging edge 26 which is extending downwardly from the upper portion rim 22. To increase engagement, the end of the diverging edge 26 of the upper portion rim 22 may include a hooked portion 130. While the preferred embodiment includes a snap fit enclosure, other mechanisms for sealing the top portion to the bottom portion can be used. For example, the upper portion 12 and the lower portion 14 can contain male/female threading in order to secure against each other by screwing the top portion to the bottom portion. Once properly secured, the liquid holding reservoir 16 is completely enclosed and can readily be filled with water 129. To fill the drool preventing drinking container 10, the completely enclosed device is inverted, exposing the bottom surface 80 of the bottom wall 76 to the user, and either placed back onto surface 131 or held in the user's hand. If not already removed, the user removes the liquid fill structure plug 88 from the liquid filling structure 86, exposing the aperture 90.

The water 129 is placed within the bowl through aperture 90, filling the liquid holding reservoir 16 to a desired level, preferably at or just below the edge 52 of the animal access chamber 32. Once the desired level has been achieved, the liquid holding reservoir 16 of the drool preventing drinking container 10 is completely enclosed by re-inserting the liquid fill structure plug 88 into the liquid filling structure 86. The user then turns the drool preventing drinking container 10 to the upright position, with the bottom wall 76 resting upon a surface 131, such as a floor or countertop. Once placed in this position, the water 129 which initially was resting along the bottom surface 20 of the upper portion 12, now rests along the top surface 78 of the bottom wall 76. As the device is flipped to the upright position, the water fills within the depressed area 116 and rises up to the edge 52 of the animal access chamber 32, thus forming an airtight enclosure. Additionally, such action may further create a vacuum within the container. As the device is initially turned to the upright position, a limited amount of water may enter into and contact the inner surface 44 of the animal access chamber 32. The level of water stored within the animal access chamber 32 is minimal, and is at a level that is lower than the amount of water stored within the liquid holding reservoir 16. Once the animal begins the drinking process, however, any water that was initially stored within the animal access chamber 32 is drawn down to a level at or slightly below edge 52. As a result of the construction of the animal access chamber 32, the surface tension between the water and the edge 52 of the animal access chamber 32, the internal vacuum formed within the device, and/or the airtight enclosure, the water level remains at a fixed level and does not enter into the animal access chamber 32.

Once filled and properly sealed, the drool preventing drinking container 10 is ready for use by a thirsty dog. Limited amounts of water may be obtained by the dog by placing the animal's face and/or snout within the generally flat region 27 and the inwardly sloping region 28 of the upper portion 12. As most dog owners are aware, as the dog drinks water, the water tends to be spread to the immediate or surrounding area. The process begins with the dog directly and somewhat forcibly extending its tongue into the opening 30. The dog's tongue extends downward until it contacts the water resting at or below the edge 52 of the animal access chamber 32. The drinking process continues as the dog curls its tongue backwards towards its body. Then formation of the curled tongue acts similar to a spoon, and it is the bottom of the curl which is responsible for creating the splash. The curled tongue then fills with liquid and is drawn into the animal as the dog pulls it back into its mouth. The action of the dog's tongue into the water breaks the surface tension and causes the release of air bubbles. As the air bubble forms, the internal vacuum or airtight seal which helps maintain the level of water at or below edge 52 is temporarily broken allowing movement of water from the liquid holding reservoir 16 to the animal access chamber 32. Additionally, as the animal's tongue is drawn back into its mouth, either the tongue itself or the excess water droplets being splashed about and not swallowed by the dog as its tongue rapidly moves inward, contacts the inner surface 44 of wall 41. As a result of the tapered ends 46 and 48 and the protuberance 50, such water is redirected back towards the edge 52.

The unique advantage of the instant invention, when compared to the cited prior references, is that as the water level flows from the liquid holding reservoir 16 to the animal access chamber 32, it finds an equilibrium level at or below the edge 52. No water enters within the inner part of the animal access chamber 32, reducing the chance that the animal has access to a large pool of water from which to obtain water. This action prevents the animal from obtaining a large amount of liquid per lick, thereby preventing or limiting drool formed therefrom. While the dog can access limited amounts of water, the advantage of this container is that, as long as the dog continues to drink, water will continuously be available to the animal through the animal access chamber 32. The amount of water accessible to the animal as it drinks, however, is limited because water does not fill the chamber or seek equilibrium levels with the liquid holding reservoir 16. Therefore, while the device prevents or minimizes the dog from drooling, it does not limit the overall amount of water that the animal can obtain.

While the primary use of the drool preventing drinking container 10 is to prevent or minimize drooling associated with drinking by providing a controlled and limited amount of water an animal can obtain at one time, the device is constructed to provide other functions. For example, the bowl can be filled with water as described above and placed on the floor in the rear of an automobile. The dog can obtain the needed amount of water by simply licking the water. As the dog licks the pool of water stored within the animal access chamber 32, additional water from the reservoir replaces any amount of water that has been obtained by the animal. As a result, there is always water available for the animal to drink, however, the amount of water available within the animal access chamber 32 is minimal. Should the dog tip the bowl over or should the automobile make an unanticipated change of direction or motion, the amount of water that could be dispersed into the car is minimal. Moreover, should the dog become hungry, the water is removed from the reservoir by removing the upper portion 12 from the lower portion 14 and dumping the water. Once all water has been removed, the user can place dog food within and the animal can now use the drool stopper drinking bowl 10 as a food reservoir.

Figure 14:
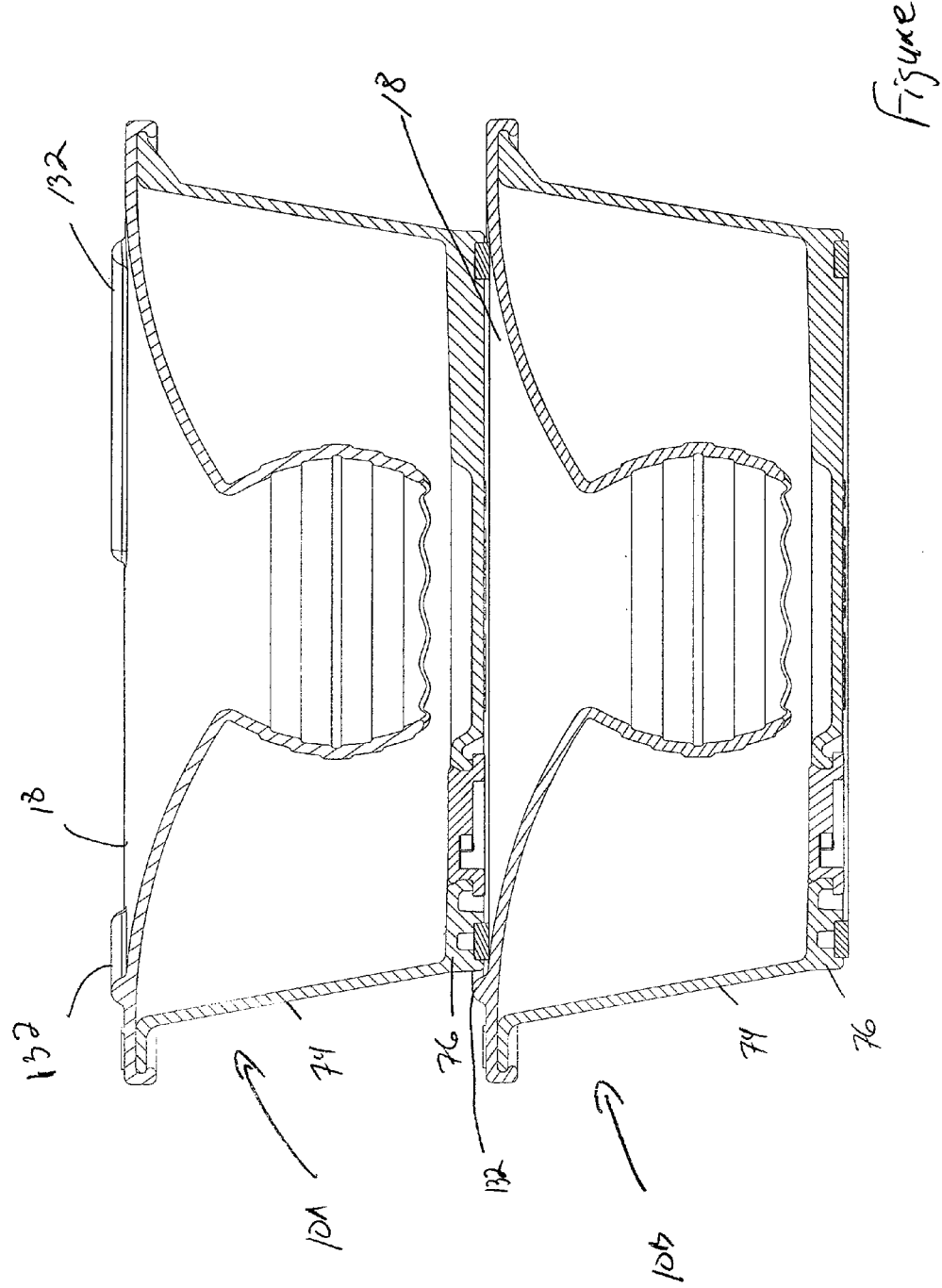
FIG. 14 is a cross-sectional view of the instant invention illustrated in FIG. 13.

Referring to FIGS. 12 through 14, to make shipment or storage of the drool preventing drinking container 10 easy, the upper portion 12 may optionally contain one or more stacking members, illustrated herein as ridges 132 positioned along the top surface 18 of the upper portion 12. The length and height of the ridges may be varied. Referring to FIG. 12, a first drool preventing drinking container 10A is illustrated in a pre-stacking position placed above a second drool preventing drinking bowl 10B. To stack the drool preventing drinking bowl 10A on top of the second drool preventing drinking container 10B, the bottom wall 76 of the drool preventing drinking container 10A is placed onto the top surface 18 of the upper portion 12 of the drool preventing drinking container 10B, see FIG. 13. Because of the tapering of the side wall 74 of the lower portion 14 and/or the size and shape of the bottom wall 76, the bottom wall 76 of the drool preventing drinking container 10A is placed onto the top surface 18 of the upper portion 12 of the drool preventing drinking container 10B and fits within the area bounded by ridges 132. As a result, the side wall 74 and the bottom wall 76 of the drool preventing drinking container 10A contact and secure against each of the ridges 132 associated with the drool preventing drinking container 10B, see FIG. 14.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A drool preventing container for dispensing limited amounts of a liquid to an animal comprising:
    a top portion constructed and arranged to sealably engage a bottom portion, said top portion having a generally smooth outer surface which slopes inwardly and terminates in a centrally positioned opening,
    a bottom portion defined by a first open end constructed and arranged to sealably engage said top portion, a second end defined by a bottom wall, and a side wall linking said first end and said bottom wall to define a reservoir for holding a liquid; said bottom wall having a liquid filling structure constructed and arranged to receive a liquid filling structure plug; wherein sealable engagement of said top portion with said bottom portion defines a drool preventing container constructed and arranged for providing an animal access to a limited amount of liquid stored within said reservoir for holding a liquid, thereby preventing or limiting drool formation as said animal drinks therefrom;
    an animal access chamber having a convex shape a main body defined by a first tapered end linked to said top portion opening, said a first tapered end directed inwardly toward said first end, a second tapered end positioned towards said bottom wall of said bottom portion and terminating in an aperture, said second tapered end directed outwardly toward said second end, and a side wall therebetween, said main body constructed and arranged to prevent said excess liquid from exiting the drool preventing drinking container as the animal drinks, and
    a liquid filling structure plug.

2. The drool preventing container for dispensing limited amounts of a liquid to an animal according to claim 1 wherein said sealable engagement of said upper portion to said lower portion forms an airtight chamber when filled with a liquid.

3. The drool preventing container for dispensing limited amounts of a liquid to an animal according to claim 1 wherein said sealable engagement of said upper portion to said lower portion forms an internal vacuum when filled with a liquid.

4. The drool preventing container for dispensing limited amounts of a liquid to an animal according to claim 1 wherein said animal access chamber has one or more tapered ends.

5. The drool preventing container for dispensing limited amounts of a liquid to an animal according to claim 1 wherein said animal access chamber further contains a protuberance positioned between said first tapered end and said second tapered end.

6. The drool preventing container for dispensing limited amounts of a liquid to an animal according to claim 1 wherein said second end of said animal access chamber has a scalloped edge.

7. The drool preventing container for dispensing limited amounts of a liquid fluid to an animal according to claim 6 wherein said scalloped edge is aligned in a substantially parallel manner to said depressed area.

8. The drool preventing container for dispensing limited amounts of a liquid to an animal according to claim 7 wherein the distance from the upper curvature of said scalloped edge to the bottom surface is a length which provides the liquid holding reservoir to be filled to near capacity while leaving a minimal amount of air within the said reservoir.

9. The drool preventing container for dispensing limited amounts of a liquid to an animal according to claim 8 wherein the distance from the lower curvature of said scalloped edge to the bottom surface of said depressed area is a length which provides the liquid holding reservoir to be filled to near capacity while leaving a minimal amount of air within the said reservoir.

10. The drool preventing container for dispensing limited amounts of a liquid to an animal according to claim 1 wherein said drool preventing container is constructed and arranged to maintain a liquid level at or below the level of said second end of said animal access chamber when filled with a liquid.

11. The drool preventing container for dispensing limited amounts of a liquid to an animal according to claim 1 wherein said bottom wall contains a depressed area constructed and arranged to limit the amount of water entering into said animal access chamber.

12. The drool preventing container for dispensing limited amounts of a liquid to an animal according to claim 1 wherein said bottom wall slopes inwardly, said inwardly sloped wall terminating in a centrally located depressed area.

13. The drool preventing container for dispensing limited amounts of a liquid to an animal according to claim 1 wherein said bottom wall contains an anti-slip member.

14. The drool preventing container for dispensing limited amounts of a liquid to an animal according to claim 1 wherein said side wall of said bottom portion is tapered.

15. The drool preventing container for dispensing limited amounts of a liquid to an animal according to claim 1 wherein the top surface is constructed and arranged to be stackable with a second drool preventing container, said top surface containing one or more ridges arranged in a manner to secure the bottom wall and the side wall of the bottom portion of said second drool preventing container to said ridges.

16. The drool preventing container for dispensing limited amounts of a liquid to an animal according to claim 1 wherein said top portion contains one or more gussets for added strength and rigidity.

17. The drool preventing container for dispensing limited amounts of a liquid to an animal according to claim 1 wherein said bottom portion contains one or more ribs for added strength and rigidity.

18. drool preventing container for dispensing limited amounts of a liquid to an animal comprising:
a top portion constructed and arranged to sealably engage a bottom portion, said top portion having a generally smooth outer surface which slopes inwardly and terminates in a centrally positioned opening,
a bottom portion defined by a first open end constructed and arranged to sealably engage said top portion, a second end defined by a bottom wall, and a side wall linking said first end and said bottom wall to define a reservoir for holding a liquid said bottom wall containing a depressed area constructed and arranged to limit the amount of water entering into said animal access chamber, said bottom wall having a liquid filling structure constructed and arranged to receive a liquid filling structure plug; wherein sealable engagement of said top portion with said bottom portion defines a drool preventing container constructed and arranged for providing an animal access to a limited amount of liquid stored within said reservoir for holding a liquid, thereby preventing or limiting drool formation as said animal drinks therefrom;
an animal access chamber having a main body defined by a first end linked to said top portion opening, a second end positioned towards said bottom wall of said bottom portion and terminating in an aperture, and a side wall therebetween, said main body constructed and arranged to prevent said excess liquid from exiting the drool preventing drinking container as the animal drinks, and
a liquid filling structure plug.

19. A drool preventing container for dispensing limited amounts of a liquid to an animal comprising:
a top portion constructed and arranged to sealably engage a bottom portion, said top portion having a generally smooth outer surface which slopes inwardly and terminates in a centrally positioned opening,
a bottom portion defined by a first open end constructed and arranged to sealably engage said top portion, a second end defined by a bottom wall, said bottom wall sloping inwardly, said inwardly sloped wall terminating in a centrally located depressed area, and a side wall linking said first end and said bottom wall to define a reservoir for holding a liquid; said bottom wall having a liquid filling structure constructed and arranged to receive a liquid filling structure plug; wherein sealable engagement of said top portion with said bottom portion defines a drool preventing container constructed and arranged for providing an animal access to a limited amount of liquid stored within said reservoir for holding a liquid, thereby preventing or limiting drool formation as said animal drinks therefrom;
an animal access chamber having a main body defined by a first end linked to said top portion opening, a second tapered end positioned towards said bottom wall of said bottom portion and terminating in an aperture, and a side wall therebetween, said main body constructed and arranged to prevent said excess liquid from exiting the drool preventing drinking container as the animal drinks, and
a liquid filling structure plug.

* * * * *